Feb. 3, 1959  R. H. NAGEL ET AL  2,871,662
VALVE SHUTTLE AND PARKING BRAKE
Filed March 10, 1954  2 Sheets-Sheet 2
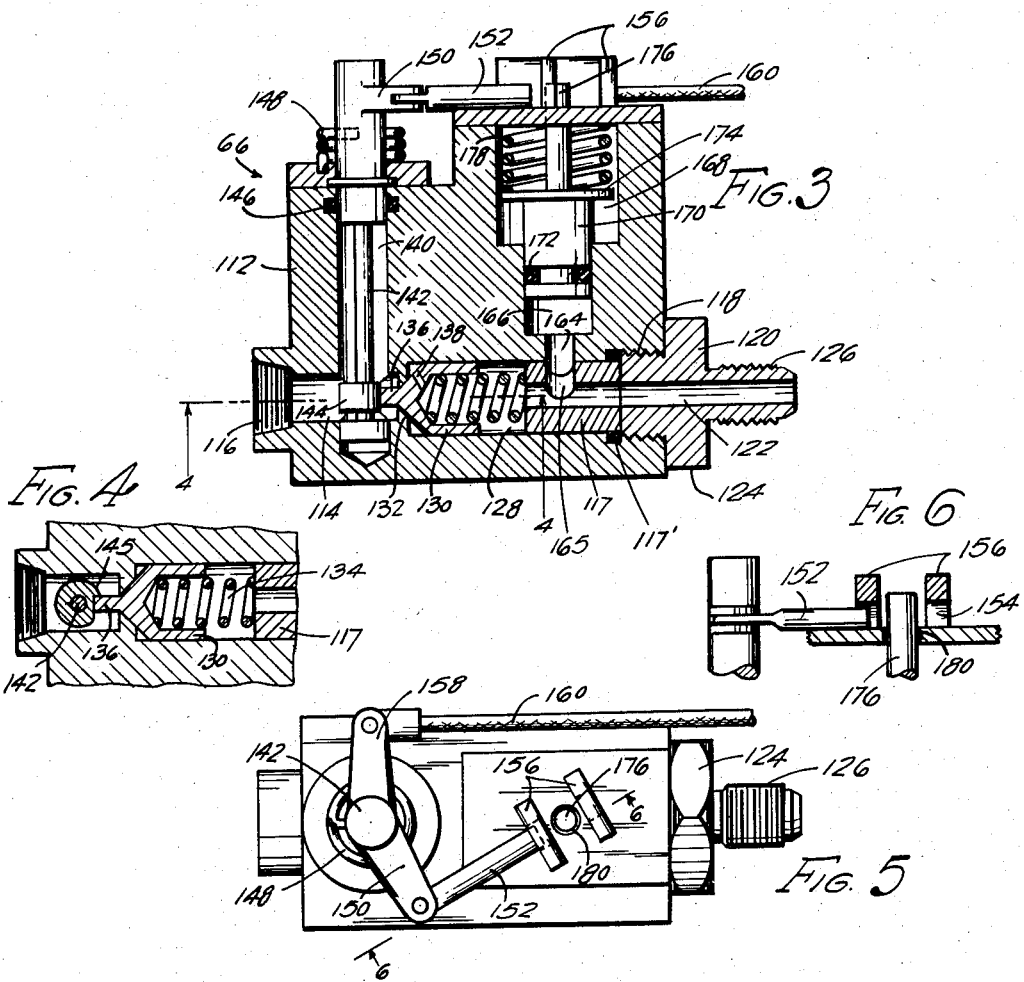
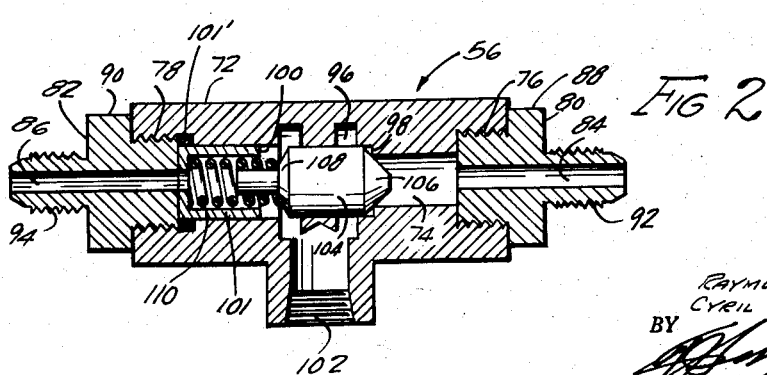
INVENTOR.
RAYMOND NAGEL
CYRIL ROGERS
BY
ATTORNEYS

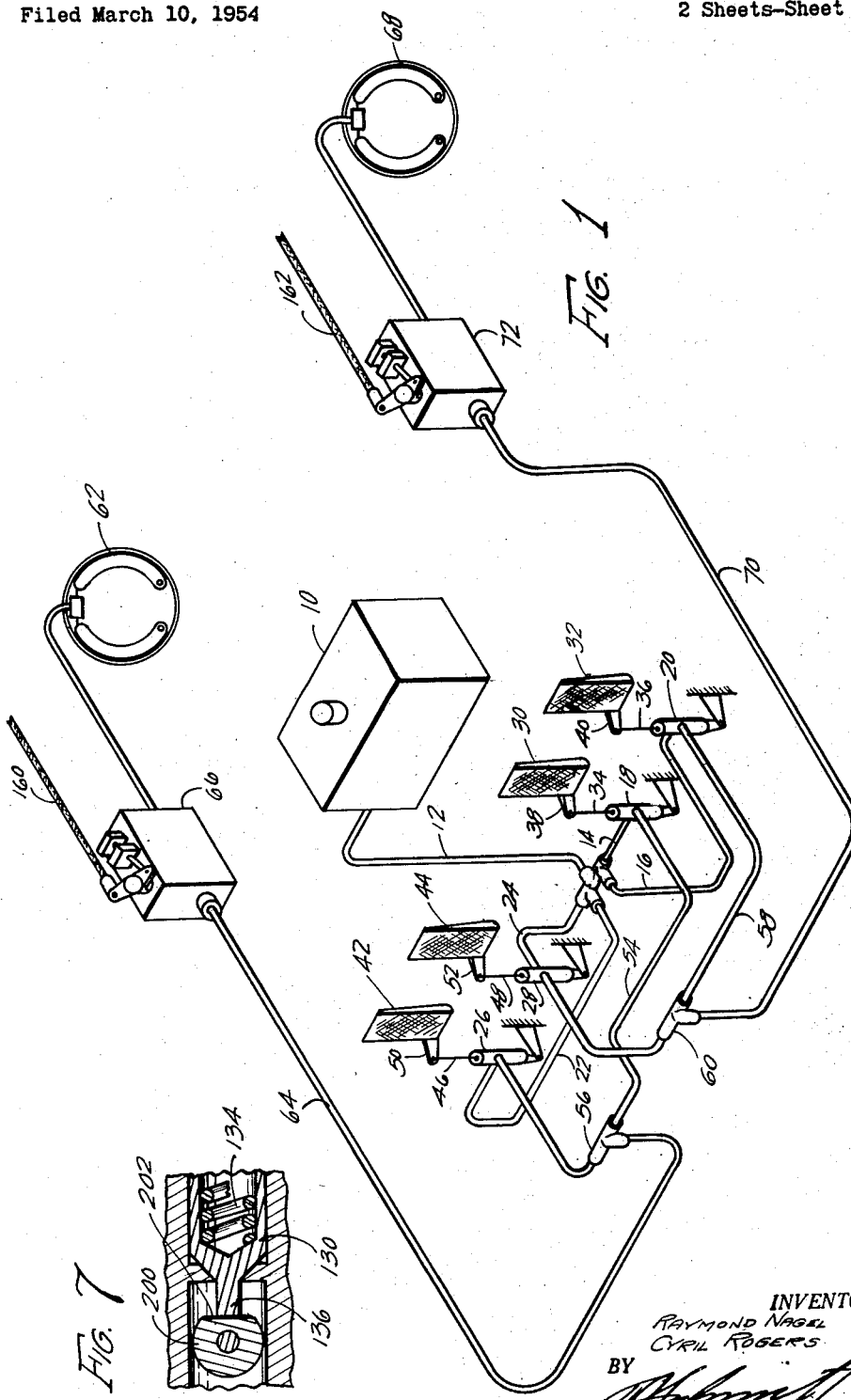

United States Patent Office 2,871,662
Patented Feb. 3, 1959

2,871,662

VALVE SHUTTLE AND PARKING BRAKE

Raymond H. Nagel, Wyandotte, Mich., and Cyril B. Rogers, Niagara Falls, N. Y., assignors, by mesne assignments, to the United States of America as represented by the Secretary of the Navy Application March 10, 1954, Serial No. 415,457

1 Claim. (Cl. 60—54.5)

This invention relates to a fluid pressure mechanism, and particularly to a fluid pressure actuated brake system for use on aircraft or other vehicles.

There were several problems in regard to braking systems for aircraft, and particularly the helicopter type of aircraft, which had, to this time, never been satisfactorily solved. First, it was necessary to obtain a braking system wherein the brakes could be readily operated by either the pilot or co-pilot independently or together in such a way that the actuation of the brake system by either one would have no effect upon the control pedals of the other. Secondly, it was necessary to obtain parking brakes which were operative by either the pilot or the co-pilot independently of each other and were releasable by either the pilot or co-pilot by foot pedal actuation only. Thirdly, it was necessary to incorporate all temperature, and leakage compensating controls required to meet applicable military specifications. All these problems have been successfully solved by this invention.

It is, therefore, one object of this invention to provide a fluid pressure operated brake device for aircraft or the like which can be independently or jointly operated through separate controls.

Another object of this invention is to provide a parking brake for aircraft or the like which is independently operative by either the pilot or co-pilot and which can be released by foot pedal actuation only.

Another object of this invention is to provide a parking brake for aircraft or the like wherein there is provided a compensating device for temperature, pressure and leakage.

Another object of this invention is to provide a fluid pressure operated brake system for aircraft and the like which is relatively simple in construction and which requires relatively little maintenance.

Other objects and many of the attendant advantages of this invention will be readily appreciated as the same becomes better understood by reference to the following detailed description when considered in connection with the accompanying drawings wherein:

Fig. 1 is a schematic view of a fluid pressure braking system embodying the invention.

Fig. 2 is a sectional view of the shuttle valve assembly.

Fig. 3 is a sectional view of parking lock and compensator device.

Fig. 4 is a view taken on line 4—4 of Fig. 3.

Fig. 5 is a top plan view of the mechanism shown in Fig. 3.

Fig. 6 is a view taken on line 6—6 of Fig. 5.

Fig. 7 is a sectional view similar to Fig. 4 showing a modified form of construction.

Referring now in greater detail to the drawings wherein similar reference characters refer to similar parts, there is provided a hydraulic fluid reservoir 10 which is connected through conduit 12 and branch conduits 14 and 16 to the pilot's respective right and left brake pedal cylinders 18 and 20, and through conduit 12 and branch conduits 22 and 24 to the co-pilot's respective right and left brake pedal cylinders 26 and 28. Pistons, not shown, are provided in each of the cylinders, the pistons on the pilot's side being operatively connected to the foot pedals 30 and 32 by the respective piston rods 34 and 36 and links 38 and 40, while the pistons on the co-pilot's side are operatively connected to the foot pedals 42 and 44 by the respective piston rods 46 and 48 and links 50 and 52. These pistons are of the type which incorporate the well known reverse flow principles in order to relieve back pressure in the brake system. The construction of these pistons has not been specifically illustrated since the specific type of piston forms no part of this invention.

The pilot's right hand cylinder 18 is connected to the right hand cylinder 26 on the co-pilot's side by a conduit 54 in which there is interposed a shuttle valve assembly 56. The pilot's left hand cylinder 20 is connected to the co-pilot's left hand cylinder 28 by a conduit 58 in which there is interposed a shuttle valve assembly 60. These shuttle valve assemblies will be more fully described hereafter.

The shuttle valve assembly 56 is connected to the right hand wheel brake 62 by a conduit 64 in which there is interposed a parking lock and compensator unit 66, to be later more fully described. The shuttle valve assembly 60 is connected to the left hand wheel brake 68 by a conduit 70 in which there is interposed a parking lock and compensator unit 72 similar to unit 66.

Hydraulic fluid flows into the brake pedal cylinders and then, either by virtue of gravity or by pumping action of the cylinders, flows through the conduits 64 and 70 to the wheel brake cylinders, thereby filling the brake system and forming a solid hydraulic linkage. Now movement of the brake pedal by the pilot causes the piston in the brake pedal cylinder to pass over the inlet from the reservoir, thereby preventing flow to the reservoir and causing flow to the wheel brakes. Release of the brake pedal by the pilot returns the brake pedal cylinder piston to its normal position, relieves the pressure in the system, and allows the excess hydraulic fluid to flow back into the reservoir.

In order for the co-pilot to actuate the brake system, the shuttle valve assemblies 56 and 60 are provided. Both of these assemblies are alike and, therefore, the description of one serves as a description of the other.

In Fig. 2 there is illustrated a sectional view of the assembly 56 wherein there is provided a cylindrical valve housing 72 having an axially extending central passage 74 therein. The ends of the housing are counterbored as at 76 and 78, these counterbores being internally threaded to respectively receive the externally threaded ends of fittings 80 and 82 having passages 84 and 86 therein. The fittings 80 and 82 are also provided with flanges as at 88 and 90 and with externally threaded nipples as at 92 and 94 for receiving the hose or pipe connections of conduit 54 from the co-pilot's and pilot's side respectively. A valve chamber 96 is formed centrally of the housing and is provided with oppositely positioned valve seats 98 and 100, the valve seat 100 being formed as part of a removable sleeve 101 which is sealingly positioned in passage 74 by an O-ring 101'. An internally threaded nipple 102 extends from the valve chamber and is adapted to receive the end connection of the conduit 64. A cylindrical shuttle valve 104 having conical ends 106 and 108 is positioned within the valve chamber. A spring 110 urges the valve toward seat 98 at the co-pilot's side; in this way, in normal condition, the fluid connection between the reservoir and the pilot's brake pedal cylinder 18 is kept open. However, movement of the co-pilot's pedal results in an increase of hydraulic pressure from his side to cause the shuttle 104 to unseat from the seat 98, against the force of the spring 110, and to seat on the valve seat 100 on the pilot's side, thereby sealing off the outlet to the pilot's brake pedal cylinder and forcing the fluid to flow from the co-pilot's cylinders to the wheel brake. Release of the brake pedal by the co-pilot allows the shuttle 104 to unseat from the seat 100 and to be moved by the spring 110 to the seat 98 closing the co-pilot's port. This allows excess hydraulic fluid to flow through the pilot's brake pedal cylinder to the hydraulic reservoir.

To utilize the parking brake (and here the term "parking brake" is used to describe a locked brake condition where the aircraft is stationary on the ground with brakes applied continuously and yet unattended) all the functions described above are used in conjunction with the functions of the parking lock and compensator units shown at 66 and 72.

The units 66 and 72 are identical and the description of one will serve as a full description of the other. Taking the unit 66 as an example therefore, this unit comprises a housing 112 having a passage 114 therein. At one end of the passage 114 is provided an internally threaded nipple 116 for receiving one portion of the conduit 64 for connecting the passage 114 with the brake pedal cylinders. At the opposite end of the passage 114 is provided a removable sleeve 117 sealingly positioned in passage 114 by an O-ring 117' and an internally threaded counterbore 118 adapted to readily receive the end of a fitting 120 having a passage 122, a flange 124 and an externally threaded nipple 126 for receiving the connecting end of that portion of conduit 64 which connects the unit 66 to the wheel brake.

Intermediate the ends of the passage 114 there is provided a valve chamber 128 in which is located a hollow, sleeve valve 130 which is urged toward closing position against seat 132 by a spring 134. A finger 136 is provided at the closed end of the valve and bleed ports 138 are provided adjacent the finger.

A bore 140 perpendicularly intersects the passage 114 adjacent the front end of the valve chamber, and in this bore is positioned a shaft 142 having a cam 144, provided with a latch member 145, adjacent its lower end in a position to contact the finger 136. An O-ring 146 provides a sealing means for the cam shaft. A torsion spring 148 is provided on the shaft outside the housing, this torsion spring acting to bias the cam around to the position wherein it presses the valve 130 away from its seat, against the action of the spring 134, thereby keeping the passage 114 open.

An arm 150 extends laterally from the upper portion of the cam shaft and, attached to this arm, is a locking pin 152 which is adapted to enter openings 154 in a pair of spaced, upstanding lugs 156 connected to the top of the housing. Another arm 158 extends from the cam shaft and to this arm is connected one end of a cable 160 which, at its other end, is attached to a parking brake handle, not shown. A similar cable 162 is connected between the parking brake handle and the unit 72.

A second bore 164 perpendicularly intersects the passage 114 mating with an opening 165 in sleeve 117, and this bore is provided with a counterbore 166 which is, itself, counterbored as at 168. Positioned for slidable movement in the two counterbores is a piston 170 having a groove therein in which is positioned an O-ring 172. The piston is provided with a flange 174 and a stem 176. A coil spring 178 surrounds the stem 176 between the flange 174 and the top of the housing. The top of the housing is provided with an opening 180 in alignment with the stem 176 and through this opening the stem is adapted to extend.

When it is desired to lock the parking brake, the parking brake handle is actuated, causing the cable 160 to rotate the cam shaft 142 against the action of the spring 148 so that the valve 130 is moved on to its seat 132 by the spring 134, and the finger 136 on the end of the valve is moved to the flat face of the cam 144 behind the latch member 145. At the same time, the rotation of the cam shaft pulls the locking pin 152 from the lug openings 154. While the locking pin is within the openings, it is in position to seat against the top of the stem 176 to prevent upward movement of the piston 170. When the pin is pulled back, however, by the rotation of the cam shaft, the stem can move through the opening 180 and the piston can rise. Now, while the parking brake handle is actuated, actuation of the foot pedals causes hydraulic fluid, under pressure, to unseat the valve 130 and to actuate the brakes. It also causes the spring 178 to compress to a load which will give compensator pressure equal to the applied pressure. As soon as the pressure in the fluid is equal on both sides of the valve 130, the valve will be moved back to its seat 132 by the spring 134 and will prevent the hydraulic fluid from flowing back to the brake pedal cylinders. At this point, release of the brake pedals traps hydraulic fluid under pressure in the brake system, which locks the brakes at the wheels, seats the valve 130, and forces the finger 136 of the valve behind the latch 145 on the cam 144, thereby preventing the torsion spring 148 from rotating the cam and forcing the valve from its seat. Now, the parking brake handle can be released to lock the brakes.

Once the parking brake has been set, the hydraulic linkage between the valve 130 and the locked wheel brakes is a closed circuit. Hydraulic fluid cannot flow out of the circuit to release the brakes. Therefore, any increase or decrease in the volume of fluid in the closed circuit, caused by an increase or decrease in temperature, would cause an increase or decrease of pressure in this portion of the hydraulic linkage unless the compensator adjusts the volume. This is accomplished by the spring loaded piston 170 of the compensator moving up to allow an increase in fluid volume and down to overcome a decrease in volume. It does this while maintaining a relatively constant hydraulic fluid pressure in the closed circuit of the brake system. The compensator simply maintains a constant pre-set pressure in the hydraulic fluid between the compensator and the braked wheels.

To unlock the parking brake, either or both of the pilot and co-pilot can apply foot pedal pressure and, when this pressure on the brake pedal side of the valve 130 exceeds the pressure on the wheel brake side, the valve will move from its seat and compress the spring 134. This will release the latch 145 on the cam and allow the torsion spring 148 to rotate the cam shaft so that the cam 144 locks the valve open. Release of the pedal pressure now allows the hydraulic fluid to flow past the valve 130 and return to the reservoir. The removal of the excess fluid pressure allows the compensation piston 170 to be moved down by the spring 178, which, in turn, allows the compensator locking pin 152 to slide through the openings 154 and lock the compensator piston in its down position. This locking out of the compensator is necessary in order to keep the brake system from feeling soft.

The parking brake handle is used only to lock the brakes. It is always in a released position except when used, and returns to that position automatically. It is not used to release the brakes.

Although a particular type of cam has been illustrated, the cam and its latch means may take any one of a number of forms. One alternate form is illustrated in Fig. 7 of the drawings. In this form, the cam 200 is merely provided with a flat area 202 on the cam face. In this case, the parts are so constructed and arranged that the torque due to the torsion spring is slightly over-reacted by the friction load on the cam face supplied by the finger 136 of the valve 130 under pressure of the spring 134, thereby providing a latching effect.

Obviously many modifications and variations of the present invention are possible in the light of the above teachings. It is, therefore, to be understood that within the scope of the appended claim the invention may be practiced otherwise than as specifically described.

What is claimed as the invention is:

A fluid operated braking system comprising a fluid source; a fluid actuated brake; a pair of independently controlled pressure inducing devices; a valve assembly; a parking brake mechanism; and a closed fluid system between the fluid source and the brake including a first fluid path that extends from the fluid source through one of the said pressure inducing devices, the valve assembly and the parking brake valve mechanism to the brake and a second fluid path that extends from the fluid source through the other of the pressure inducing devices, the valve assembly and the parking brake valve mechanism to the brake; said valve assembly including a shuttle type valve element which is normally biased toward a first position where the first fluid path is open and the second fluid path is closed and which assumes a second position closing the first fluid path and opening the second fluid path when the said other pressure inducing device is actuated; said parking brake mechanism comprising valve means through which fluid of the fluid system must flow, means biasing the valve means towards a closed position wherein flow of fluid in the system toward the fluid source is prevented and flow toward the brake is not substantially restricted, cam means for normally maintaining the valve means in an open position, and parking brake operating means for rotating the cam means causing the valve biasing means to move into its said closed position; means for automatically compensating for loss of fluid pressure in the system between the said valve means and the brake when the parking brake is engaged; and means for maintaining the compensating means inoperative when the parking brake is disengaged.

References Cited in the file of this patent

UNITED STATES PATENTS

| | | |
|---|---|---|
| 2,024,549 | Tarris | Dec. 17, 1935 |
| 2,258,798 | Patrick | Oct. 14, 1941 |
| 2,301,037 | Greene | Nov. 3, 1942 |
| 2,322,062 | Schnell | June 15, 1943 |
| 2,343,809 | Schnell | Mar. 7, 1944 |
| 2,366,921 | Majneri et al. | Jan. 9, 1945 |
| 2,443,642 | Rockwell | June 22, 1948 |
| 2,467,560 | Majneri | Apr. 19, 1949 |
| 2,494,461 | Trevaskis | Jan. 10, 1950 |
| 2,526,570 | Majneri | Oct. 17, 1950 |
| 2,633,711 | Torrence | Apr. 17, 1953 |